United States Patent [19]

Mikols

[11] Patent Number: 4,490,493
[45] Date of Patent: Dec. 25, 1984

[54] STABILIZED BITUMINOUS BLENDS

[75] Inventor: Wayne J. Mikols, Katy, Tex.

[73] Assignee: Shell Oil Company, Houston, Tex.

[21] Appl. No.: 562,253

[22] Filed: Dec. 16, 1983

[51] Int. Cl.$^3$ .................... C08L 53/00; C08L 53/02; C08L 95/00

[52] U.S. Cl. .................................. 524/68; 524/505; 525/54.5

[58] Field of Search .................. 524/68, 505; 525/54.5

[56] References Cited

U.S. PATENT DOCUMENTS

| | | | |
|---|---|---|---|
| 3,856,732 | 12/1974 | Bresson et al. | 524/68 |
| 4,145,322 | 3/1979 | Maldonado et al. | 524/68 |
| 4,196,115 | 4/1980 | Bresson | 524/68 |
| 4,381,357 | 4/1983 | von der Wettern et al. | 524/68 |

Primary Examiner—Allan M. Lieberman
Attorney, Agent, or Firm—Peter A. Bielinski

[57] ABSTRACT

The invention comprises a plastic bituminous composition comprising:
(a) 100–30% w of a mixture of
  (1) 40–99.8% w of a bituminous component having a penetration of less than 800 (0.1 MM) at 25° C.;
  (2) 0.1–50% w of a block copolymer having at least two monoalkenyl arene polymer end blocks and at least one elastomeric conjugated diene mid block B;
  (3) 0.1–10.0% w of an (ethylene-propylene)-styrene block copolymer
(b) 0–70% w of a filler.

7 Claims, No Drawings

STABILIZED BITUMINOUS BLENDS

BACKGROUND OF THE INVENTION

1. Field of the Invention

The present invention relates to a method for stabilizing bitumen-polymer blends and to novel plastic bituminous compositions produced thereby which are especially useful in roofing, paving and adhesives applications. The invention also relates to articles having self-adhesive properties based on such plastic bituminous compositions. The compositions according to the present invention comprise at least a bituminous component, a thermoplastic polymeric component and an ethylene-propylene-styrene block copolymer.

2. Prior Art

Since the late 1960's, styrene-butadiene rubber and styrene-rubber block copolymers have been used to dramatically improve the thermal and mechanical properties of asphalts. Practical application of the rubber addition approach requires that the blended product retain improved properties and homogenity during transportation, storage, and processing. Long term performance of elastomer-modified asphalts also depends on the ability of the blend to maintain thermal and chemical stability.

In the past, it was discovered that selection of a particular bitumen played an important role in the long term thermal, mechanical and chemical stability of the blended product. This lead to much research on the compatibility of thermoplastic polymers with various types of asphalts. Results of this research stressed a need for the use of "special" bitumen's to develop premium quality products with improved and/or stabilized properties. It was determined that in part, the reduction in material properties observed for "incompatible" bitumens resulted from the advancement of microphase separation. Previous attempts have been made to stabilize the thermal, mechanical, and chemical properties of incompatible thermoplastic rubber-asphalt blends. Those attemps have been based on the chemical modification of the asphalt. The microphase separation occurs between the asphaltene and maltene rich phases of elastomer modified blends.

SUMMARY OF THE INVENTION

The present invention provides a method for stabilizing the microstructure of thermoplastic polymer-bitumen by incorporating a small amount of diblock copolymers. The method of the present invention greatly improves the long term properties of elastomer-asphalt blends and broadens the range of asphalts available to produce quality products. Small amounts of the diblock copolymer serve to stabilize the asphaltene-maltene phase microstructure of these asphalt polymer blends. Stabilization is believed to occur as a result of the difference in solubility parameters between the diblock copolymer and the butylene or butadiene based polymers. Hence, stabilization is far less dependent on asphalt chemistry than previous compatibilization schemes. This invention is important in the modified asphalt roofing industry where long service life is desirable. Similar benefits could be achieved in the road paving industry on products such as chip joint and crack seals, and waterproofing emulsions, and in the auto industry with undercoatings and sound deadening coatings.

The present invention therefore relates to plastic bituminous compositions comprising:
(a) 100–30%w of a mixture of
 (1) 40–99.8%w of a bituminous component having a penetration of less than 800 (0.1 MM) at 25° C.;
 (b 2) 0.1–50%w of a thermoplastic block copolymer having at least one monoalkenyl arene polymer block and at least one elastomeric conjugated diene block B;
 (3) 0.1–10.0%w of an polystyrene-poly (ethylene-propylene) diblock copolymer
(b) 0–70%w of a filler.

DETAILED DESCRIPTION OF THE INVENTION

The bituminous component present in the plastic butuminous compositions according to the present invention may be a naturally occurring bitumen or derived from a mineral oil. Also petroleum pitches obtained by a cracking process and coal tar can be used as the bituminous component as well as blends of various bituminous materials.

Examples of suitable components include distillation or "straight-run bitumens", precipitation bitumens, e.g., propane bitumens, blown bitumens and mixtures thereof. Other suitable bituminous components include mixtures of one or more of these bitumens with extenders such as petroleum extracts, e.g., aromatic extracts, distillates or residues. Suitble bituminous components (either "straight-run bitumens" or "fluxed bitumens") are those having a penetration <800 (0.1 mm) at 25° C. Preference is given to the use of bitumens having a penetration of from 10 to 200 (0.1 mm) at 25° C. The amount of bituminous component to be used in the plastic bituminous compositions is preferably 75 and 99.5%w calculated on mixtures containing 30–100% of the ingredients 1, 2 and 3.

Any thermoplastic polymeric component which does not significantly impair the plastic properties of the plastic bituminous compositions according to the present invention can be used. Suitable thermoplastic polymeric components are for instance thermoplastic polymers prepared by the polymerization of olefinically unsaturated monomers. These polymers may be prepared from monomers which contain exclusively carbon and hydrogen. Examples of such polymers are polyethylene, polypropylene, polyisobutylene, polyisoprene, polybutadiene, ethylene-butylene copolymers and styrene-butadiene copolymers. Good results have been obtained using styrene-butadiene copolymers. The polymers may also be prepared from monomers which, in addition to containing carbon and hydrogen, at least in part contain one or more other elements, such as oxygen. Examples of such polymers are ethylene-vinyl acetate copolymers, ethylene-ethyl acrylate copolymers and ethylene-n-butyl acrylate copolymers. Some commercial thermoplastic polymers may be in admixture with various extender oils and these compositions may also be used as a component of the self-adhesives. Any extender oil present is regarded as a part of the bituminous component insofar as the %w of the components of the present invention are concerned. The preferred amount of polymeric component present in the compositions according to the invention is from 0.1–10%w as those compositions have the most pronounced plastic properties.

A further class of thermoplastic polymers for use as a component of the plastic bituminous compositions are block copolymers having the general configuration:

A—B—(—B—A)n, wherein each A is a thermoplastic polymer block of a monovinyl aromatic hydrocarbon or a 1-alkene, B is an elastomeric polymer block of a conjugated diene or more than 1-alkene and n is an integer, suitably from 0 to 5, or a (partly) hydrogenated derivative of the block copolymer.

The polymer blocks A preferably have a number average molecular weight, in the range of from 2,000 to 100,000, particularly from 7,500 to 50,000. The polymer block B preferably has an average molecular weight in the range of from 25,000 to 1,000,000, particularly from 35,000 to 150,000. Whenever according to the branched configuration two or more blocks B are immediately adjacent to each other they are treated as a single block for purposes of molecular weight. The amount of polymer blocks A in the block copolymers preferably ranges from 10 to 70%w, particularly from 20 to 50%w.

Suitable examples of block copolymers are: polystyrene-polybutadiene, polystyrene-(polyethylene-butylene) polystyrene-polyisoprene-polystyrene, polystyrene-polybutadiene-polystyrene, polystyrene-poly(ethylene-butylene)-polystyrene, polyethylene-(ethylene-propylene copolymer)-polyethylene, polypropylene-(ethylenepropylene copolymer)-polypropylene, and their hydrogenated counterparts.

The block copolymers may be formed by a number of different types of processes known in the art.

Linear and branched block copolymers can be used as well as the so-called star-shaped polymers which are obtained by using polyalkenyl coupling agents, e.g., divinyl pyridine and polyvinylbenzenes such as divinylbenzene in the polymerization process.

The block copolymers may be hydrogenated if desired by any suitable technique. The hydrogenation may be complete or partial. It is also possible to selectively hydrogenate just the center block so as to convert, e.g., a polyisoprene block to an ethylene propylene rubber (EPR) block.

Mixtures of one or more thermoplastic polymers may also be used. Suitable mixtures are referred to in the Dutch patent application Nos. 7,411,373 and 6,706,408.

The third essential component in the plastic bituminous compositions according to the present invention comprises polystyrene poly(ethylene-propylene) diblock copolymers. The amount of polystyrene poly(ethylene-propylene) diblock copolymers is preferably in the range of from 0.1–10%w, calculated on mixtures containing 30–100%w of the ingredients 1, 2 and 3.

The plastic bituminous compositions according to the present invention may also contain one or more fillers. Amounts of filler(s) up to 70%, calculated on the total mixture of the ingredients 1, 2, 3 and filler may be suitably applied. The fillers can be of inorganic and/or organic nature and are known to those skilled in the art. Examples of suitable fillers comprise chalk, limestone, unbaked powdered gypsum, talcum, fly ash, coal combustion waste, pigments such as titanium dioxide, iron oxide, chromium oxide, diatomaceous earth and other clays, quartz flour and the various carbon blacks. Preferred amounts of filler to be used in the plastic bituminous compositions range from 15–60%w on total mixture. Most preferred are filler amounts in the range of from 25 to 50%w on total mixture.

If desired, the plastic bituminous compositions according to the present invention may also contain a solvent which may facilitate the applicability of the compositions. The use of a solvent may lead to thixotropic pastes which have a trowelling or brushing consistency. Examples of suitable solvents having a boiling point between 30° and 250° C. comprise hydrocarbons, especially aromatic hydrocarbons such as benzene, toluene and the xylenes. Good results have been obtained using xylenes as solvents. Halogenated hydrocarbons and especially chlorinated hydrocarbons can also be used as solvents. Examples of halogenated hydrocarbons comprise dichloromethane, trichloromethane, 1,1,1-trichloroethane and 1,1,2,2-tetrachloroethane. Preferably, the solvents applied should at the one hand improve the handleability of the compositions and at the other hand be capable of easy removal.

The amount of solvent to be used is not critical and can vary between wide limits which are basically determined by the type of (fluxed) bitumen used and the intended application of the plastic bituminous compositions. Amounts of solvents up to 50%w, calculated on the total mixture of the ingredients 1, 2 and 3 can be used suitably, preference being given to the use of solvents in an amount of up to 25%w. The solvent may be incorporated into the plastic bituminous composition as such but it may also be mixed with one or more of the ingredients 1, 2 and 3 prior to the preparation of the composition.

The plastic bituminous compositions according to the present invention may be prepared by various methods. A convenient method comprises blending of the (fluxed) bitumen and the thermoplastic polymeric components at an elevated temperature.

Solvent containing composition can be suitably prepared by blending a pre-blend containing a bituminous component, and a filler, if desired, with the polymer/solvent blend. The pre-blend can be obtained by mixing the bituminous component, and the filler, if any, at a suitable temperature. Optionally, a solvent can also be added to the ready composition.

The present invention therefore also relates to articles which contain a plastic bituminous composition comprising:
(a) 100–30%w of a mixture of
  (1) 40–99.8%w of a bituminous component having a penetration of less than 800 (0.1 MM) at 25° C.;
  (2) 0.1–50%w of a block copolymer having at least one monoalkenyl arene polymer block and at least one elastomeric conjugated diene block B;
  (3) 0.1–10.0%w of a polystyrene poly(ethylene-propylene) diblock copolymer
(b) 0–70%w of a filler.

EXAMPLES

The "compatibility test" described below is a simple method for accessing phase separation in asphalt-polymer blends. Two different asphalts which normally demonstrate significant degrees of "incompatibility" or phase separation were examined. The results are tabulated in Table 1. Viscosity values were obtained on a Brookfield viscometer equipped with a thermocell. Ring and Ball (R&B) softening point values were obtained in accordance with procedure ASTM-D-2398. 150 g penetration values are reported in accordance with ASTM-D-5.

15%w copolymer was mixed into the asphalt using a high shear mixer (375° F.) to get a good blend. The mixture was transferred to a pint paint can. The top of the can was blanketed with $N_2$ then sealed. The can was aged for 5 days at 160° C., then cooled. The can was removed by cutting and the properties of the material at the top and bottom were determined.

The bituminous compositions were prepared by using propane bitumen with a penetration of 169 dmm for Examples 1-5 and 82 dmm for Examples 6-8. Copolymer #1 is a styrene-butadiene-styrene block copolymer having 31%w styrene and a molecular weight distribution of 16,000-74,000-16,000. Copolymer #2 is a styrene-butadiene-styrene radial block copolymer having the structure (SB)$_{3.5}$, 30%w styrene and having a weight distribution of 19,000-44,000 for the SB diblock.

Diblock copolymer #1 is a diblock containing an ethylene-propylene block of 63,400 molecular weight and a styrene block of 36,600 molecular weight. Diblock copolymer #2 is a diblock with ethylene-propylene block of 106,000 and styrene block of 40,000 molecular weight.

TABLE 1

| Component | Summary of Asphalt Stabilization Data | | | | | | | |
|---|---|---|---|---|---|---|---|---|
| | 1 | 2 | 3 | 4 | 5 | 6 | 7 | 8 |
| AC-5 Asphalt (Bitumen) | 85.0 | 85.0 | 85.0 | 85.0 | 85.0 | — | — | — |
| AC-10 Asphalt | — | — | — | — | — | 85.0 | 85.0 | 85.0 |
| Thermoplastic Copolymer #1 | 15.0 | 14.5 | 10.0 | 13.0 | 10.0 | 15.0 | 13.0 | — |
| Thermoplastic Copolymer #2 | — | — | — | — | — | — | — | 13.0 |
| Diblock Copolymer #1 | — | 0.5 | — | 2.0 | 5.0 | — | 2.0 | 2.0 |
| Diblock Copolymer #2 | — | — | 5.0 | — | — | — | — | — |
| Unaged R&B, (°F.) | 224 | 229 | 222 | 233 | 230 | 240 | 236 | 270 |
| Aged Top R&B, (°F.) | 226 | 229 | 219 | 225 | 219 | 248 | 254 | 264 |
| Aged Bot. R&B, (°F.) | 192 | 213 | 222 | 222 | 211 | 233 | 232 | 259 |
| Unaged Pen, (dmm) | 46 | 40 | 43 | 39 | 43 | 29 | 32 | 31 |
| Aged Top Pen, (dmm) | 65 | 51 | 40 | 35 | 43 | 39 | 31 | 32 |
| Aged Bot. Pen, (dmm) | 52 | 38 | 45 | 35 | 44 | 31 | 31 | 32 |
| Unaged 180° C. Visc., (cps) | 4188 | 5188 | 5500 | 5850 | 5000 | 5375 | 5312 | 6438 |
| Aged Top 180° C. Visc., (cps) | 5312 | 6250 | 7662 | 6312 | 6625 | 13000 | 7938 | 8688 |
| Aged Bot. 180° C. Visc., (cps) | 1050 | 3938 | 5750 | 5938 | 6680 | 6625 | 5688 | 6625 |
| Separation Index* | 1.02 | 0.45 | 0.35 | 0.06 | −0.01 | 1.19 | 0.42 | 0.32 |

*Separation Index = [(Aged Top Visc. − Aged Bot. Visc.)/Unaged Visc.]. A completely stable mixture should have a Separation Index = 0.00.

The Separation Index reported in this Table demonstrates significant improvement in the thermal-chemical phase stability of formulations containing styrene-(ethylene-propylene) diblock copolymer. Such improvement has a significant impact on the long term property aging characteristics of modified bitumens. This can be seen by comparing the separation indices for blends #1 and #6 which contain no diblock copolymer with the separation indices for blends 2-5, 7 and 8.

What is claimed is:

1. A plastic bituminous composition comprising:
   (a) 100–30%w of a mixture of
      (1) 40–99.8%w based on the total weight of (1), (2) and (3) of a bituminous component having a penetration of less than 800 (0.1 MM) at 25° C.;
      (2) 0.1–50%w based on the total weight of (1), (2) and (3) of a thermoplastic block copolymer having at least one monoalkenyl arene polymer block and at least one elastomeric conjugated diene block B;
      (3) 0.1–10.0%w based on the total weight of (1), (2) and (3) of an (ethylene-propylene)-styrene diblock copolymer
   (b) 0–70%w of a filler.

2. A composition according to claim 1 wherein the bituminous component has a penetration of from 5 to 300 (0.1 mm) at 25° C.

3. A composition according to claim 1 or 2 wherein the amount of the bituminous component is from 75 to 95%w.

4. A composition according to claim 1 wherein the amount of thermoplastic polymer is from 1%–15%w.

5. A composition according to claim 1 wherein the amount of filler is from 0–50%w.

6. A composition according to claim 1 which also contains up to 50% of a hydrocarbon or halogenated hydrocarbon solvent having a boiling point between 30° and 250° C.

7. A process for stabilizing bitumen-thermoplastic polymer blends comprising mixing
   (a) 100–30%w of a mixture of
      (1) 40–99.8%w based on the total weight of (1), (2) and (3) of a bituminous component having a penetration of less than 800 (0.1 MM) at 25° C.;
      (2) 0.1–50%w based on the total weight of (1), (2) and (3) of a thermoplastic block copolymer having at least one monoalkenyl arene polymer block and at least one elastomeric conjugated diene block B;
      (3) 0.1–10.0%w based on the total weight of (1), (2) and (3) of an (ethylene-propylene)-styrene diblock copolymer
   (b) 0–70%w of a filler.

* * * * *